United States Patent
Dutta et al.

(10) Patent No.: US 12,341,732 B2
(45) Date of Patent: Jun. 24, 2025

(54) RANKING CHATBOT PROFILES

(71) Applicant: Optum Technology, Inc., Eden Prairie, MN (US)

(72) Inventors: Rahul Dutta, Bangalore (IN); Amit Krishna, Bangalore (IN); Love Hasija, Sonepat (IN); Atul Kumar, Bangalore (IN)

(73) Assignee: Optum Technology, Inc., Eden Prairie, MN (US)

( * ) Notice: Subject to any disclaimer, the term of this patent is extended or adjusted under 35 U.S.C. 154(b) by 899 days.

(21) Appl. No.: 17/132,841

(22) Filed: Dec. 23, 2020

(65) Prior Publication Data

US 2022/0200934 A1    Jun. 23, 2022

(51) Int. Cl.
| | |
|---|---|
| *G06N 20/00* | (2019.01) |
| *G06F 40/35* | (2020.01) |
| *G06N 3/045* | (2023.01) |
| *G06V 40/10* | (2022.01) |
| *G06V 40/16* | (2022.01) |
| *G10L 15/22* | (2006.01) |

(Continued)

(52) U.S. Cl.
CPC .............. *H04L 51/02* (2013.01); *G06F 40/35* (2020.01); *G06N 20/00* (2019.01); *G06V 40/10* (2022.01); *G06V 40/176* (2022.01); *G10L 15/22* (2013.01); *H04L 67/535* (2022.05); *G06V 40/15* (2022.01)

(58) Field of Classification Search
CPC ....... H04L 51/02; H04L 67/535; G06N 20/00; G06N 3/045; G06N 3/047; G06N 3/006; G06N 3/088; G06V 40/10; G06V 40/176; G06V 40/15; G06V 40/174; G10L 13/047
See application file for complete search history.

(56) References Cited

U.S. PATENT DOCUMENTS

| | | | |
|---|---|---|---|
| 8,719,200 B2 * | 5/2014 | Beilby | G09B 7/00 706/45 |
| 9,369,410 B2 * | 6/2016 | Capper | G06N 3/004 |
| 10,019,060 B2 | 7/2018 | Cash | |

(Continued)

FOREIGN PATENT DOCUMENTS

WO    2019183062 A1    9/2019

OTHER PUBLICATIONS

Völkel, Sarah Theres, and Lale Kaya. "Examining user preference for agreeableness in chatbots." Proceedings of the 3rd Conference on Conversational User Interfaces. 2021. (Year: 2021).*

(Continued)

*Primary Examiner* — Jordany Nunez
(74) *Attorney, Agent, or Firm* — Shumaker & Sieffert, P.A.

(57) ABSTRACT

A computing system initializes a score for each chatbot profile of a plurality of chatbot profiles. The chatbot profiles correspond to different personas. For each chatbot profile, the computing system collects biometric response data for a user while the user has an interaction session with the chatbot profile. The computing system updates the score for the chatbot profile based on the biometric response data for the user collected while the user has the interaction session with the chatbot profile. The computing system ranks the chatbot profiles based on the scores and selects a chatbot profile from the plurality of chatbot profiles for a subsequent interaction session with the user based on the ranking of the chatbot profiles.

20 Claims, 6 Drawing Sheets

(51) Int. Cl.
    *H04L 51/02*     (2022.01)
    *H04L 67/50*     (2022.01)

(56) References Cited

U.S. PATENT DOCUMENTS

| | | | |
|---|---|---|---|
| 10,192,551 | B2 | 1/2019 | Carbune et al. |
| 10,522,143 | B2 | 12/2019 | Chandrasekaran et al. |
| 10,853,424 | B1* | 12/2020 | Mandaviya ............... G06N 7/01 |
| 10,999,434 | B1* | 5/2021 | Andar ....................... G06N 5/04 |
| 11,115,353 | B1* | 9/2021 | Crowley ............... G06F 40/284 |
| 11,178,078 | B2* | 11/2021 | Stoehr .................... G06Q 30/01 |
| 2003/0220972 | A1* | 11/2003 | Montet .................... H04L 51/04 |
| | | | 709/204 |
| 2006/0015487 | A1* | 1/2006 | Vest ........................ G06Q 30/02 |
| 2008/0096533 | A1 | 4/2008 | Manfredi et al. |
| 2010/0274889 | A1* | 10/2010 | Carter ..................... H04L 67/02 |
| | | | 709/224 |
| 2012/0088221 | A1* | 4/2012 | Moen ....................... G06N 5/02 |
| | | | 434/362 |
| 2012/0095835 | A1* | 4/2012 | Makar ................... G06N 20/00 |
| | | | 705/14.66 |
| 2014/0236953 | A1* | 8/2014 | Rapaport ............... G06F 16/285 |
| | | | 707/740 |
| 2014/0250195 | A1* | 9/2014 | Capper .................. G06N 3/004 |
| | | | 709/206 |
| 2014/0279050 | A1* | 9/2014 | Makar ................. G06F 16/9535 |
| | | | 705/14.66 |
| 2015/0199010 | A1* | 7/2015 | Coleman ................ H04L 67/01 |
| | | | 345/156 |
| 2015/0306340 | A1* | 10/2015 | Giap ........................ A61B 6/46 |
| | | | 600/301 |
| 2016/0042648 | A1* | 2/2016 | Kothuri ................. G06V 40/166 |
| | | | 434/236 |
| 2016/0294739 | A1* | 10/2016 | Stoehr ................. G06Q 30/0269 |
| 2017/0046748 | A1* | 2/2017 | Zhou .................. G06Q 30/0276 |
| 2017/0372374 | A1* | 12/2017 | Brown ............... G06Q 30/0269 |
| 2018/0039618 | A1 | 2/2018 | Kumar et al. |
| 2018/0054523 | A1* | 2/2018 | Zhang ..................... H04M 7/0045 |
| 2018/0331839 | A1 | 11/2018 | Gao et al. |
| 2018/0357286 | A1 | 12/2018 | Wang et al. |
| 2019/0109803 | A1* | 4/2019 | Akkiraju .................. G09B 5/02 |
| 2019/0156222 | A1* | 5/2019 | Emma ..................... G06F 16/22 |
| 2019/0202063 | A1 | 7/2019 | Shukla |
| 2019/0243899 | A1* | 8/2019 | Yi ........................... G06F 16/00 |
| 2019/0248004 | A1* | 8/2019 | Nelson .................... G06N 5/04 |
| 2019/0286712 | A1* | 9/2019 | Terry ..................... H04L 51/02 |
| 2019/0303967 | A1* | 10/2019 | Wijaya ................. H04L 67/306 |
| 2020/0005118 | A1* | 1/2020 | Chen .................... G06F 16/3329 |
| 2020/0145615 | A1 | 5/2020 | Seko et al. |
| 2020/0274877 | A1* | 8/2020 | Kwatra ................... H04L 43/04 |
| 2021/0036973 | A1* | 2/2021 | Venkateshwaran ........................ |
| | | | H04L 41/5074 |
| 2021/0142225 | A1* | 5/2021 | Odinaev .................. B25J 9/161 |
| 2022/0045974 | A1* | 2/2022 | Hodge .................... H04L 67/02 |
| 2022/0070121 | A1* | 3/2022 | Stoehr ............... G06Q 30/0269 |
| 2022/0394337 | A1* | 12/2022 | Vagharshakian .. G06Q 30/0201 |
| 2023/0306448 | A1* | 9/2023 | Ravindranath .... G06Q 30/0201 |
| | | | 705/7.29 |
| 2023/0376328 | A1* | 11/2023 | Nagar ................... G06F 16/248 |

OTHER PUBLICATIONS

Mehra, Brinda. "Chatbot personality preferences in Global South urban English speakers." Social Sciences & Humanities Open 3.1 (2021): 100131. (Year: 2021).*

De Haan, Hayco, et al. "Chatbot personality and customer satisfaction." Info Support Research (2018). (Year: 2018).*

Gao et al., "Voice Impersonation Using Generative Adversarial Networks," arXiv.org, arXiv:1802.06840v1, Feb. 19, 2018, 5 pp.

Tachibana et al., "Efficiently Trainable Text-to-Speech System Based on Deep Convolutional Networks with Guided Attention," arXiv.org, arXiv:1710.08969v1, Oct. 24, 2017, 5 pp.

Arriaga et al., "Real-time Convolutional Neural Networks for Emotion and Gender Classification," https://arxiv.org/abs/1710.07557, Oct. 20, 2017, 5 pp.

Huang et al., "Combining Facial Expressions and Electroencephalography to Enhance Emotion Recognition," Future Internet, https://www.mdpi.com/1999-5903/11/5/105/pdf, 11(105), May 2, 2019, 17 pp.

Chaparro et al., "Emotion Recognition from EEG and Facial Expressions: a Multimodal Approach," IEEE, 2018 40th Annual International Conference of the IEEE Engineering in Medicine and Biology Society (EMBC), Jul. 18-21, 2018, pp. 530-533.

Lee et al., "The ChatBot Feels You—A Counseling Service Using Emotional Response Generation," 2017 IEEE International Conference on Big Data and Smart Computing, Retrieved: https://ieeexplore.ieee.org/abstract/document/7881752/, Feb. 13-16, 2017, pp. 437-440.

Oh et al., "A Chatbot for Psychiatric Counseling in Mental Healthcare Service Based on Emotional Dialogue Analysis and Sentence Generation," IEEE, in Proceedings of 18th International Conference on Mobile Data Management, May 29-Jun. 1, 2017, pp. 371-376.

Ajmera, "Emotionally Intelligent ChatBots—Part 1: Getting emotions from user's face," Chatbots Life, Retrieved May 11, 2021 from: https://chatbotslife.com/emotionally-intelligent-chatbots-part-1-getting-emotions-from-users-face-4c07447dada8, Dec. 13, 2017, 16 pp.

Sarkar et al., "Understanding Responses to Stimuli (Emotions) using Brainwaves in Order to Regulate them and Utilize the Data to Develop Intelligent Machines," International Journal for Research in Applied Science & Engineering Technology (IJRASET), vol. 6 Issue II, Feb. 2018, pp. 959-966.

Rajkumar et al., "Bio-Inspiring Learning Style Chatbot Inventory using Brain Computing Interface to Increase the Efficiency of E-Learning," IEEE Access; vol. 8, Mar. 31, 2020, pp. 67377-67395.

* cited by examiner ns of various celebrities, family members, fictional characters, and so on. Different users may have different emotional responses when interacting with different chatbot profiles. For instance, a user may experience positive emotions when interacting with one chatbot profile but experience negative or neutral emotions when interacting with other chatbot profiles. A user is more likely to keep interacting with a chatbot configured with a chatbot profile when the user experiences positive emotions when interacting with the chatbot profile. This disclosure describes techniques for ranking and selecting chatbot profiles for individual users.

RANKING CHATBOT PROFILES

TECHNICAL FIELD

This disclosure relates to computing systems that implement chatbots.

BACKGROUND

Chatbots are software applications that are used to conduct online conversations with human users. Chatbots may interact with human users via text or synthetic speech. Typically, chatbots are configured to interact with human users in a way that simulates interaction with other humans. Chatbots have been growing increasingly sophisticated in recent years as artificial intelligence systems have improved.

SUMMARY

Chatbots may be configured with different chatbot profiles. The chatbot profiles correspond to different personas. For instance, chatbot profiles may correspond to the personas of various celebrities, family members, fictional characters, and so on. Different users may have different emotional responses when interacting with different chatbot profiles. For instance, a user may experience positive emotions when interacting with one chatbot profile but experience negative or neutral emotions when interacting with other chatbot profiles. A user is more likely to keep interacting with a chatbot configured with a chatbot profile when the user experiences positive emotions when interacting with the chatbot profile. This disclosure describes techniques for ranking and selecting chatbot profiles for individual users.

In one aspect, this disclosure describes a method comprising storing, by a computing system, a score for each chatbot profile of a plurality of chatbot profiles, wherein each of the chatbot profiles corresponds to a different persona; for each chatbot profile of the plurality of chatbot profiles: collecting, by the computing system, biometric response data for a user while the user has an interaction session with the chatbot profile; and updating, by the computing system, the score for the chatbot profile based on the biometric response data for the user collected while the user has the interaction session with the chatbot profile; determining, by the computing system, a ranking of the chatbot profiles based on the scores for the chatbot profiles; and selecting, by the computing system, a chatbot profile from the plurality of chatbot profiles for a subsequent interaction session with the user based on the ranking of the chatbot profiles.

In another example, this disclosure describes a computing system comprising a storage system configured to store a score for each chatbot profile of a plurality of chatbot profiles, wherein each of the chatbot profiles corresponds to a different persona; and one or more processors configured to: for each chatbot profile of the plurality of chatbot profiles: collect biometric response data for a user while the user has an interaction session with the chatbot profile; and update the score for the chatbot profile based on the biometric response data for the user collected while the user has the interaction session with the chatbot profile; determine a ranking of the chatbot profiles based on the scores for the chatbot profiles; and select a chatbot profile from the plurality of chatbot profiles for a subsequent interaction session with the user based on the ranking of the chatbot profiles.

In another example, this disclosure describes a computer-readable storage medium having instructions stored thereon that, when executed, cause a computing system to: store a score for each chatbot profile of a plurality of chatbot profiles, wherein each of the chatbot profiles corresponds to a different persona; for each chatbot profile of the plurality of chatbot profiles: collect biometric response data for a user while the user has an interaction session with the chatbot profile; and update the score for the chatbot profile based on the biometric response data for the user collected while the user has the interaction session with the chatbot profile; determine a ranking of the chatbot profiles based on the scores for the chatbot profiles; and select a chatbot profile from the plurality of chatbot profiles for a subsequent interaction session with the user based on the ranking of the chatbot profiles.

The details of one or more aspects of the disclosure are set forth in the accompanying drawings and the description below. Other features, objects, and advantages of the techniques described in this disclosure will be apparent from the description, drawings, and claims.

DETAILED DESCRIPTION

Figure 1:
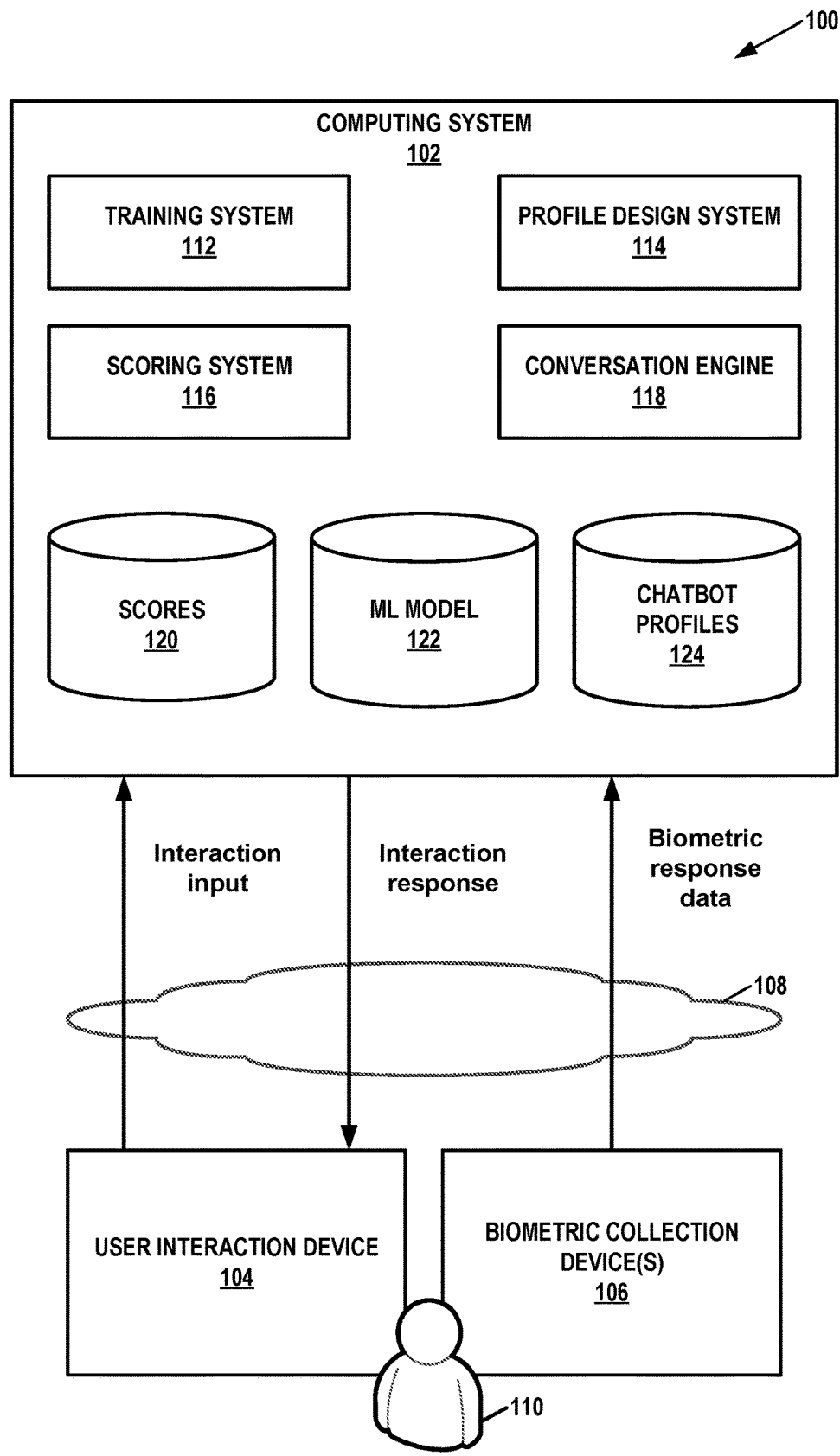
FIG. 1 is a block diagram illustrating an example system in accordance with one or more aspects of this disclosure.

FIG. 1 is a block diagram illustrating an example system 100 in accordance with one or more aspects of this disclosure. In the example of FIG. 1, system 100 includes a computing system 102, a user interaction device 104, one or more biometric collection devices 106, and a communication network 108. In other examples, system 100 may include more, fewer, or different devices, system, or components. In some examples, system 100 may include additional user interaction devices, biometric collection devices, and so on.

Computing system 102 may include one or more computing devices. In examples where computing system 102 includes two or more computing devices, the computing devices of computing system 102 may act together as a system. Example types of computing devices include server devices, personal computers, handheld computers, tablet devices, smartphones, intermediate network devices, data storage devices, and so on. In examples where computing system 102 includes two or more computing devices, the computing devices of computing system 102 may be geographically distributed or concentrated together, e.g., in a single data center. As described herein, computing system 102 may be configured to select one or more chatbot profiles for a human user 110 and conduct chatbot interaction sessions with user 110.

Similarly, user interaction device 104 may comprise one or more computing devices. In examples where user interaction device 104 includes two or more computing devices, the computing devices of user interaction device 104 may act together as a system. User interaction device 104 may include a computing device, such as a mobile telephone, tablet, personal computer, wearable device, smart speaker device, augmented/mixed/virtual reality headset, smart eyewear, ambient computing device, special-purpose computing device, projection device, or other type of computing device. In general, user 110 may use user interaction device 104 to conduct chatbot interaction sessions.

The one or more biometric collection devices 106 (which may be referred to more concisely as "biometric collection device(s) 106") are configured to collect biometric response data from user 110. Computing system 102 may use the biometric response data collected from user 110 as part of a process to select one or more chatbot profiles for user 110. In some examples, biometric collection device(s) 106 may be integrated into devices of computing system 102.

Computing system 102, user interaction device 104, and biometric collection device(s) 106 may communicate via communication network 108. In some examples, communication network 108 may include a wide area network, such as the Internet, a local area network, a cellular communication network, and/or other types of communication networks. Communication network 108 may include wireless or wire-based communication links.

User 110 is a person that uses user interaction device 104 to interact with chatbots hosted by computing system 102. In some examples, user 110 may wish to interact with a chatbot to relieve feelings of depression or loneliness. In such examples, the chatbot may begin to act as a virtual friend to user 110 and user 110 may engage in conversations with the chatbot as though the chatbot were a real person. Depression and loneliness are increasingly common problems, especially given current issues such as aging populations, pandemics, increased social distancing, and increased society and environmental tensions. In some examples, user 110 may be a person on the autism spectrum who may feel more comfortable interacting with a chatbot than with a real person. In such examples, computing system 102 may be operated by or on behalf of a healthcare provider, health insurance provider, government agency, or other type of organization that helps to manage the health of user 110. Example types of healthcare providers may include physicians, hospitals, clinics, nursing homes, psychiatric institutions, therapists, and other types of individuals and organizations that perform healthcare actions.

Chatbot profiles are typically most effective when users have positive emotional responses when interacting with the chatbot profiles. For instance, users may wish to continue engaging with a chatbot profile that makes them feel happy and not wish to continue engaging with a chatbot profile that makes them feel sad. Users self-reported indications of their emotions when interacting with a chatbot profile may not necessarily be consistent with their actual emotions when interacting with the chatbot profile. For instance, a user with depression may not perceive and report happiness when interacting with a chatbot profile, but that chatbot profile may in fact subconsciously produce positive emotions in the user. Repeated production of positive emotions in the user may eventually lead to building rapport between the user and the chatbot profile, which may lead to increased interaction between the user and the chatbot profile, which may ultimately help relieve symptoms experienced by the user. Similarly, in the case of a user on the autism spectrum, the user may have difficulty articulating their emotional responses when interacting with a chatbot profile.

The emotional responses of user 110 when interacting with a chatbot profile may be inferred from one or more types of biometric response data collected by biometric collection device(s) 106 while user 110 has an interaction session with the chatbot profile. For example, biometric collection device(s) 106 may include a device configured to detect electroencephalogram (EEG) signals generated by the brain of user 110. The EEG signals may have different patterns when user 110 experiences different emotions. In some examples, biometric collection device(s) 106 may include a facial expression detector configured to detect facial expressions of user 110. The facial expression detector may include one or more cameras positioned to capture images of the face of user 110. In some examples, biometric collection device(s) 106 may include an infrared dot projector and a detector to detect infrared dots on the face of user 110. Biometric collection device(s) 106 may determine a 3-dimensional depth map of the face of user 110 based on the infrared dots. The facial expression of user 110 can be determined (e.g., by biometric collection device(s) 106, computing system 102, etc.) based on the 3-dimensional depth map of the face of user 110.

In some examples, biometric collection device(s) 106 include devices for collection blood oxygen saturation data for user 110. The level of blood oxygen saturation of user 110 may correspond to an anxiety level of user 110. In some examples, biometric collection device(s) 106 may collect electromyographic (EMG) data (e.g., using electrodes) indicative of activation of specific muscles (e.g., craniofacial muscles, neck muscles, etc.) that may be consciously or subconsciously activated or relaxed based on the emotional reactions of user 110. In some examples, biometric collection device(s) 106 may include devices (e.g., electrodes, optical sensors, etc.) configured to detect cardiac responses of user 100, such as devices configured to generate electrooculography signals, devices to detect pulse rate, and so on. In some examples, biometric collection device(s) 106 may include devices (e.g., electrodes, cameras, optical sensors, etc.) to detect movements of the eyes of user 110, e.g., movements of the eyes as a whole, pupil dilation, movements of the eyes to change focal distance, and so on.

The biometric response data collected from different users may be different for the same emotional response. For example, the EEG signals of a first user when experiencing sadness may differ from the EEG signals of a second user when experiencing sadness.

Long term use of biometric collection device(s) 106 may be impractical for many users. For instance, user 110 may find that wearing a device for generating EEG signals to be uncomfortable and intrusive, and hardly the conducive to establishing rapport with a chatbot system. Similarly, devices for detecting facial expressions, EMG signals, eye movements, and other types of biometric response data may not be practical for long term use. Other types of biometric collection devices, such as devices for detecting cardiac responses and blood oxygen saturation, may be used long term to detect emotional responses of user 110, especially when such biometric collection devices are integrated into wearable devices, such as smart watches. However, biometric collection devices that are practical for long term use may not be as reliable in determining emotional responses as certain biometric collection devices that are less suitable for long term use. Thus, one of the challenges associated with implementing a computing system that hosts chatbot profiles is how to evaluate chatbot profiles based on the emotional responses of user 110.

In accordance with one or more techniques of this disclosure, computing system 102 may perform a process that scores and ranks a plurality of chatbot profiles based at least in part on biometric response data collected from user 110 while user 110 has interaction sessions with the plurality of chatbot profiles. After completing the interaction sessions with the plurality of chatbot profiles, computing system 102 may select one of the chatbot profiles for subsequent interaction sessions with user 110. During the subsequent interaction sessions, it may be unnecessary for user 110 to wear or use one or more of the biometric collection device(s) 106. In this way, the convenience of use of computing system 102 may be increased while user 110 may continue to interact with a chatbot profile that has been determined to generate positive emotional responses in user 110.

In the example of FIG. 1, computing system 102 includes a training system 112, a profile design system 114, a scoring system 116, and a conversation engine 118. Additionally, computing system 102 may store data representing scores 120, a machine learning (ML) model 122, and chatbot profiles 124. Such components and data are presented as examples and functionality of computing system 102 may be implemented in other ways. In some examples, some or all of the functionality of computing system 102 may be implemented in user interaction device 104 or another type of device. Although the example of FIG. 1 only shows a single ML model 122, computing system 102 may include multiple ML models.

As previously described, the biometric response data may be different for different users. Accordingly, training system 112 may perform a training process to train ML model 122 to detect emotional responses of user 110 based on biometric response data of user 110. Details regarding example training processes are provided elsewhere in this disclosure.

Profile design system 114 may facilitate the design of chatbot profiles 124. As described herein, profile design system 114 may configure chatbot profiles 124 to correspond to different personas. Each of chatbot profiles 124 may correspond to a different persona.

Scoring system 116 is configured to score and rank chatbot profiles 124. As described herein, scoring system 116 may initialize scores 120 for chatbot profiles 124. For each of chatbot profiles 124, scoring system 116 may collect biometric response data for user 110 while user 110 has an interaction session with the chatbot profile. Additionally, scoring system 116 may update the score for the chatbot profile based on the biometric response data for user 110 collected while user 110 has the interaction session with the chatbot profile. Scoring system 116 may determine a ranking of chatbot profiles 124 based on the scores for chatbot profiles 124. Scoring system 116 may select a chatbot profile from the plurality of chatbot profiles for a subsequent interaction session with user 110 based on the ranking of chatbot profiles 124.

Conversation engine 118 may use chatbot profiles 124 to conduct interaction sessions with user 110 via user interface device 104. Thus, conversation engine 118 may receive interaction input from user interaction device 104 and provide interaction responses to user 110 via user interaction device 104. The interaction input and/or interaction response may be in the form of text data, voice data, video data, numerical data, and/or other types of data. In some examples, conversation engine 118 may be implemented using a DialogFlow system from Google Inc., a Rasa system from Rasa Technologies Inc., or another system.

Figure 2:
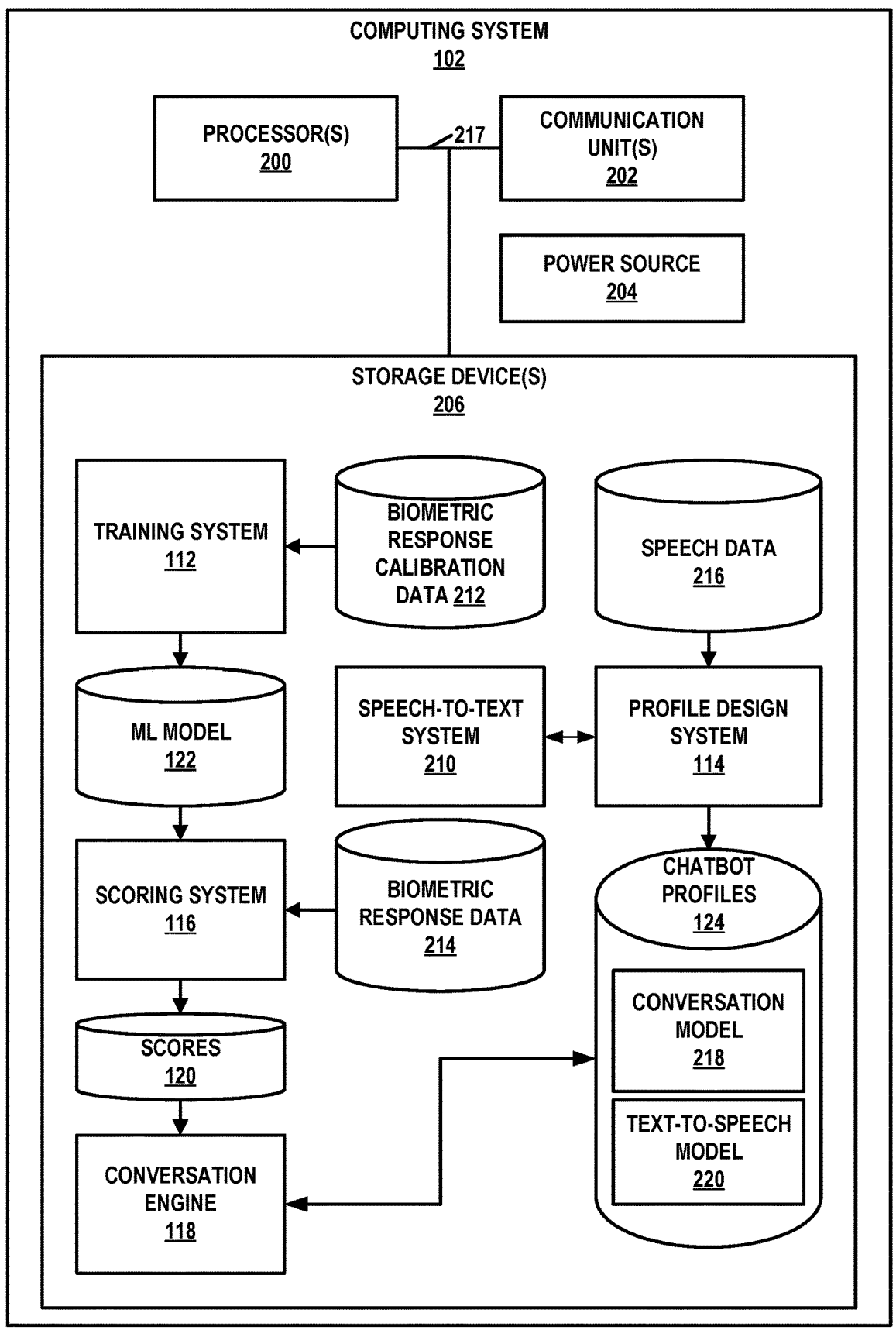
FIG. 2 is a block diagram illustrating example components of a computing system in accordance with one or more aspects of this disclosure.

FIG. 2 is a block diagram illustrating example components of computing system 102 in accordance with one or more aspects of this disclosure. FIG. 2 illustrates only one particular example of computing system 102, without limitation on many other example configurations of computing system 102.

As shown in the example of FIG. 2, computing system 102 includes one or more processors 200, one or more communication units 202, a power source 204, one or more storage devices 206, and one or more communication channels 217. Computing system 102 may include other components. For example, computing system 102 may include input devices, output devices, display screens, and so on. Communication channels 217 may interconnect each of components 200, 202, and 206 for inter-component communications (physically, communicatively, and/or operatively). In some examples, communication channel(s) 217 may include a system bus, a network connection, an inter-process communication data structure, or any other method for communicating data. Power source 204 may provide electrical energy to components 200, 202, and 206. Storage device(s) 206 may store information required for use during operation of computing system 102.

Processor(s) 200 comprises circuitry configured to perform processing functions. For instance, one or more of processor(s) 200 may be a microprocessor, application-specific integrated circuit (ASIC), field-programmable gate array (FPGA), or other type of processing circuit. In some examples, processor(s) 200 of computing system 102 read and may execute instructions stored by storage device(s) 206.

Communication unit(s) 202 may enable computing system 102 to send data to and receive data from one or more other computing devices (e.g., via a communications network, such as a local area network or the Internet). For instance, communication unit(s) 202 may be configured to receive and send biometric response data, interaction inputs, interaction responses, and so on. In some examples, communication unit(s) 202 may include wireless transmitters and receivers that enable computing system 102 to communicate wirelessly with the other computing devices. Examples of communication unit(s) 202 may include network interface cards, Ethernet cards, optical transceivers, radio frequency transceivers, or other types of devices that are able to send and receive information. Other examples of such communication units may include BLUETOOTH™, 3G, 4G, 5G, and WI-FI™ radios, Universal Serial Bus (USB) interfaces, etc. Computing system 102 may use communication unit(s) 202 to communicate with one or more other computing devices or systems, such as user interaction device 104 and biometric collection device(s) 106.

Storage device(s) 206 may store data and instructions. Processor(s) 200 may read instructions from storage device(s) 206 and may execute instructions stored by storage device(s) 206. Execution of the instructions by processor(s) 200 may configure or cause computing system 102 to provide at least some of the functionality ascribed in this disclosure to computing system 102 or components thereof.

As shown in the example of FIG. 2, storage device(s) 206 include computer-readable instructions associated with training system 112, profile design system 114, scoring system 116, conversation engine 118, and a speech-to-text system 210. Additionally, storage device(s) 206 may store data representing scores 120, ML model 122, profiles 124, biometric response calibration data 212, biometric response data 214, and speech data 216.

As shown in the example of FIG. 2, profile design system 114 may generate profiles 124. Conversation engine 118 may use profiles 124 to engage in interaction sessions with users, such as user 110. In the example of FIG. 2, each of profiles 124 may include a conversation model 218 and a text-to-speech model 220. Conversation model 218 is a model configured to generate text-based output for use in an interaction session with a user. Text-to-speech model 220 is a model configured to convert text generated by conversation model 218 to voice data. During an interaction session, conversation engine 118 may provide interaction input to the conversation model 218 of a profile to generate a textual response. Conversation model 218 may then use text-to-speech model 220 to generate voice data based on the textual response. Conversation model 218 may then provide the voice data to user interaction device 104 as an interaction response.

As part of the process to generate a profile, profile design system 114 may train text-to-speech model 220 based on speech data 216. Speech data 216 may include audio recordings of speech from one or more people, such as a celebrity, a family member, a person portraying a fictional character, and so on. In the example of FIG. 2, profile design system 114 may use speech-to-text system 210 to convert speech data 216 to text. In other words, when generating a profile having a personal, speech-to-text system 210 may obtain transcribed speech of a person having the persona corresponding to the chatbot profile.

Profile design system 114 may train conversation model 218 to generate responses based on the transcribed speech. For example, profile design system 114 may train conversation model 218 to map utterances of user 110 to pieces of the transcribed speech. In some examples, conversation model 218 is implemented as one or more artificial neural networks. In some examples, such as examples where conversation model 218 is implemented using DialogFlow, a conversation designer may determine a set of intents that indicate correspond to various things that that user 110 intends to convey. An example of an intent may be that user 110 wants a book recommendation. Conversation model 218 may also be configured with a set of responses that corresponds to the intents. In some examples, the conversation designer may determine the responses based on previously obtained responses of a specific person, such as a celebrity, a family member, a person portraying a fictional character, and so on. A machine learning model, such as an artificial neural network, of conversation model 218 may be trained to map utterances of user 110 to intents. Thus, when user 110 makes an utterance, conversation model 218 may determine an intent. Conversation model 218 may then generate a response that corresponds to the determined intent. Thus, the response generated by conversation model 218 may mimic the style of the specific person. Furthermore, conversation engine 118 may apply conversation model 218 to generate the responses during interaction sessions with user 110.

In some examples, conversation model 218 generates text-based responses during interaction sessions. Accordingly, conversation engine 118 may use text-to-speech model 220 to generate speech based on the text-based responses generated by conversation model 218. In some examples, text-to-speech model 220 is implemented using a text-to-mel spectrogram network and a spectrogram super-resolution network (SSRN). In this example, the text-to-mel spectrogram network may be defined using a text encoder, an audio encoder, a guided attention system, and an audio decoder. In some examples, the text-to-mel spectrogram network and the SSRN may operate in parallel.

In some examples, the text encoder may be implemented using two 1-dimensional convolutional layers (e.g., with a dropout rate of 0.5 for each of the two 1-dimensional convolutional layers), each of which are followed by a respective normalization layer, a sigmoid activation function layer, and a dropout layer (e.g., with a dropout rate of 0). In some examples, the audio encoder may be implemented using three 1-dimensional convolution layers (e.g., with padding='Causal' and dropout rate=0.05), which are followed by two normalization layers, a sigmoid activation function layer, and a dropout layer (e.g., with a rate of 0.05). In some examples, the guided attention system may be implemented by firstly multiplying the output of the text encoder and audio encoder. Next, the guided attention system may generate masks and paddings using TensorFlow's library, e.g., using the following structure:

key_masks=tf.sequence_mask(prev_max_attentions, 180)
reverse_masks=tf.sequence_mask(180-3-prev_max_attentions, 180)[:, ::-1]
masks=tf.logical_or(key_masks, reverse_masks)
masks=tf.tile(tf.expand_dims(masks, 1), [1, 210, 1])
paddings=tf.ones_like(A)*(-2**32+1)
A=tf.where(tf.equal(masks, False), A, paddings)

This may then be followed in the guided attention system by a softmax layer, an argmax calculation, matrix multiplications, and a transpose layer.

The audio decoder may be defined as a 1-dimensional convolution layer (padding='Causal' and dropout rate=0.05) that is followed by a dropout layer (e.g., rate=0.05) and three 1-dimensional convolution layers (e.g., with causal padding, a dropout rate of 0.05, a ReLU activation function) and a sigmoid activation function. The first layer will be built in this format:

tensor=conv1d(R,filters=256,size=1,rate=1, padding="CAUSAL",dropout_rate=0.05,training=True)→a single 1-dimensional convolution layer (padding='Causal' and dropout rate=0.05)
H1, H2=tf.split(tensor, 2, axis=-1)→Splitting the layer into two parts
H1=tf.contrib.layers.layer_norm(H1,scope="H1")→Normalization layer
H2=tf.contrib.layers.layer_norm((H2, scope="H2")→Normalization layer
H1=tf.nn.sigmoid(H1, "gate")→First H1 is followed by a sigmoid activation function
H2=activation_fn(H2, "info") if activation_fn is not None else H2→Second H2 is followed by a sigmoid activation function
tensor=H1*H2+(1.-H1)*_inputs→The first layer is be formed with the help of two split layers (H1 and H2)

The SSRN may be defined as one 1-dimensional convolutional layer which is formed with the output of the audio decoder. The layer is followed with a 2-dimensional convolutional transpose layer (e.g., with padding: same and kernel_initializer: variance scaling_initializer), a squeeze layer, and a normalizer layer. The first layer may be built in this format after initialization:

tensor=conv1d(R,filters=256, size=1,rate=1, padding="CAUSAL", dropout_rate=0.05,training=True)→Single 1-dimensional convolution layer (padding='Causal' and dropout rate=0.05)

H1, H2=tf.split(tensor, 2, axis=−1)→Splitting the layer into two parts

H1=tf.contrib.layers.layer_norm(H1,scope="H1")→Normalization layer

H2=tf.contrib.layers.layer_norm((H2, scope="H2")→Normalization layer

H1=tf.nn.sigmoid(H1, "gate")→First H1 is followed by a sigmoid activation function H2=activation_fn(H2, "info") if activation_fn is not None else H2→Second H2 is followed by a sigmoid activation function tensor=H1*H2+(1.−H1)*_inputs→The first layer will be formed with the help of two split layers (H1 and H2)

The configuration of the SSRN described above may be repeated for a better result. In some examples, the last layer of the SSRN is followed by a sigmoid function.

Furthermore, in some examples, after text-to-speech model 220 is trained, profile design system 114 may use transfer learning to adapt text-to-speech model 220 based on the speech data of a specific person, such as somebody known to user 110. For instance, profile design system 114 may use approximately 1-2 hours of speech data as a basis for transfer learning to adapt text-to-speech model 220 to sound like the specific person.

Profile design system 114 may use the text generated by speech-to-text system 210 and the corresponding audio recordings of speech data 216 as training data to train text-to-speech model 220 of the profile to generate audio data that sounds like the speaker of the audio recordings of speech data 216 for any text generated by conversation model 218 of the profile.

In some examples, text-to-speech model 220 may be implemented in one of a variety of ways. For instance, in some examples, text-to-speech model 220 may be implemented as one or more deep convolutional neural networks with guided attention. In some examples, text-to-speech model 220 may be implemented using a generative adversarial network. In some such examples, text-to-speech model 220 may be trained using approximately 150-160 hours of speech, which may be readily available for some individuals, such as celebrities and certain fictional characters.

As previously noted, different users may generate different biometric responses data for the same emotional response. Therefore, training system 112 may train ML model 122 to map biometric response data to emotional response values that correspond to emotional responses of user 110 during interaction sessions with chatbot profiles. In the example of FIG. 2, training system 112 may collect biometric response calibration data 212 for user 100 and train ML model 122 to generate emotional response values for interaction sessions with chatbot profiles based on biometric response calibration data 212 of user 110. The biometric response calibration data 212 is biometric response data that is used for training ML model 122 to generate the emotional response values. An example process to collect biometric response calibration data 212 for user 110 and to train ML model 122 is described below with respect to FIG. 4.

Computing system 102 may collect, for each of chatbot profiles 124, biometric response data 214 for user 110 while user 110 has an interaction session with the chatbot profile. Furthermore, for each of chatbot profiles 124, scoring system 116 may apply ML model 122 to determine an emotional response value for the interaction session with the chatbot profile based on the biometric response data 214 collected from user 110 while user 110 has the interaction session with the chatbot profile. The emotional response value for the interaction session with the chatbot profile is associated with an emotional response of the user to the chatbot profile represented by the biometric response data collected from user 110 while user 110 has the interaction session with the chatbot profile.

Scoring system 116 may then update the score for the chatbot profile based on the emotional response value for the interaction session with the chatbot profile. For example, scoring system 116 may initialize the score for the chatbot profile to a specific value (e.g., 0, 100, etc.) and ML model 122 may be configured to generate higher emotional response values for increasingly negative emotional responses and lower emotional response values for increasingly positive emotional responses. In other examples, ML model 122 may be configured to generate lower emotional response values for increasingly negative emotional responses and higher emotional response values for increasingly positive emotional responses. In this example, scoring system 116 may determine, based on the emotional response value for the interaction session with the chatbot profile, a session score for the interaction session. In some examples, the session score for the interaction session may be the same as the emotional response value for the interaction session. In other examples, such as examples where scoring system 116 uses multiple ML models to generate multiple emotional response values for the same interaction session, scoring system 116 may determine the session score based on the multiple emotional response values for the interaction session. For instance, scoring system 116 may determine the session score for the interaction session as a weighted average of the emotional response values for the interaction session.

Scoring system 116 may then update the score for the chatbot profile based on the session score. For instance, scoring system 116 may update the score for the chatbot profile to be equal to (or otherwise based on) an average, weighted average, median, etc., of session scores for previous interaction sessions that user 110 has had with the chatbot profile. As user 110 engages in subsequent interaction sessions with the chatbot profile, computing system 102 may collect more biometric reaction data for user 110, and scoring system 116 may repeatedly apply ML model 122 to generate new emotional response values, new session scores, and updates to the score for the chatbot profile.

Scoring system 116 may determine a ranking of chatbot profiles 124 based on the scores for chatbot profiles 124. For example, scoring system 116 may give higher rankings to chatbot profiles 124 with lower scores and lower rankings to chatbot profiles 124 with higher scores. In other examples, scoring system 116 may give higher rankings to chatbot profiles 124 with higher scores and lower rankings to chatbot profiles 124 with lower scores.

When user 110 initiates a subsequent interaction session, conversation engine 118 may select a chatbot profile from the plurality of chatbot profiles 124 for a subsequent interaction session with user 110 based on the ranking of chatbot profiles 124. For instance, conversation engine 118 may select the top-ranked chatbot profile for use in the subsequent interaction session with user 110. During the subsequent interaction session, it may not be necessary for user 110 to use biometric collection device(s) 106. Not needing to use biometric collection device(s) 106 during subsequent interaction sessions may make it more convenient for user 110 to engage in interaction sessions.

Figure 3:
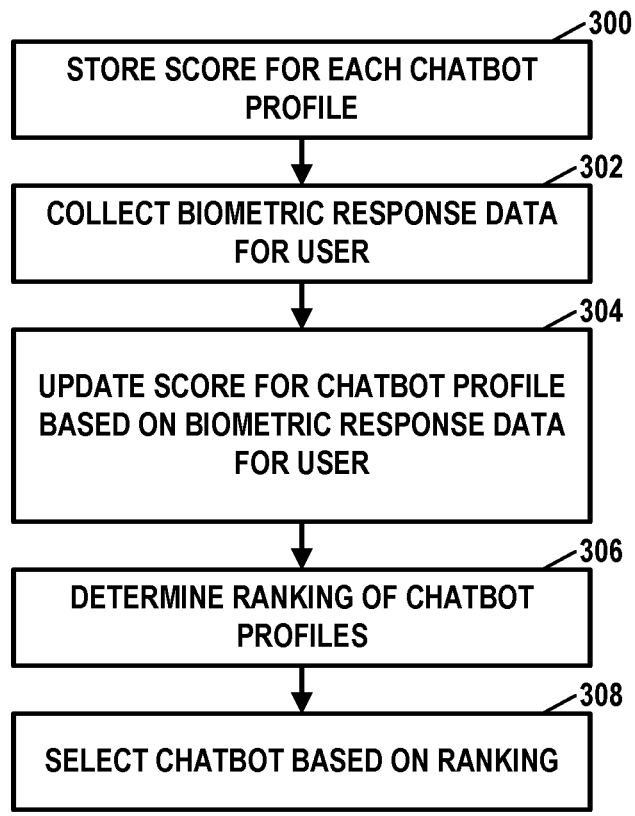
FIG. 3 is a flowchart illustrating an example operation of a computing system in accordance with one or more techniques of this disclosure.

FIG. 3 is a flowchart illustrating an example operation of a computing system in accordance with one or more techniques of this disclosure. The operations shown in the flowcharts of this disclosure are provided as examples. In other examples, operations may include more, fewer, or different actions, and/or actions may be performed in different orders. The flowcharts of this disclosure are explained with reference to FIG. 1 and FIG. 2. However, in other examples, the actions described in the flowcharts may be performed in other contexts and by other components.

In the example of FIG. 3, storage device(s) 206 of computing system 102 may store a score for each chatbot profile of a plurality of chatbot profiles 124 (300). Each of the chatbot profiles corresponds to a different persona. For each chatbot profile of the plurality of chatbot profiles, computing system 102 may collect biometric response data 214 for user 110 while user 110 has an interaction session with the chatbot profile (302).

Figure 7:
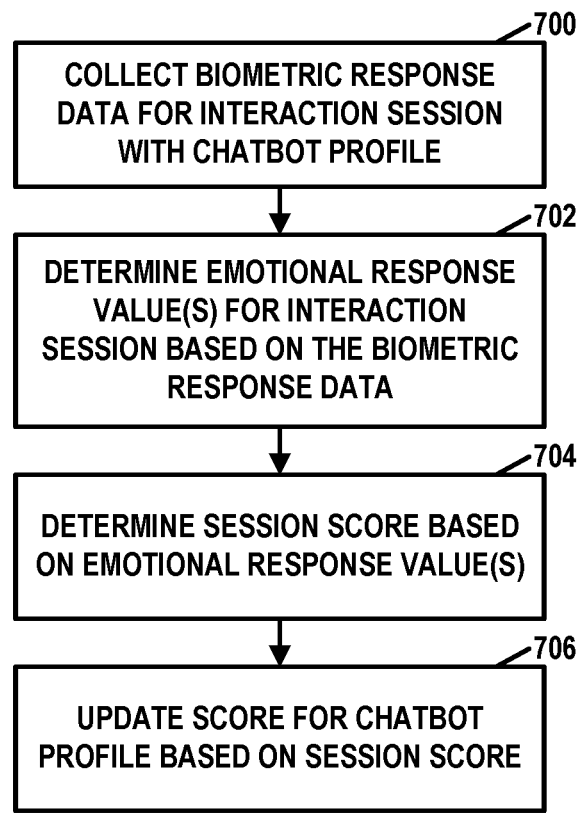
FIG. 7 is a flowchart illustrating an example operation of a computing system for determining a score for a chatbot profile in accordance with one or more techniques of this disclosure.

Furthermore, in the example of FIG. 3, scoring system 116 of computing system 102 may update the score for the chatbot profile based on the biometric response data for the user collected while the user has the interaction session with the chatbot profile (304). FIG. 7, which is described in detail below, shows an example operation for updating the scores for chatbot profiles.

Additionally, scoring system 116 may determine a ranking of the chatbot profiles based on the scores for the chatbot profiles (306). Computing system 102 (e.g., conversation engine 118 of computing system 102) may select a chatbot profile from the plurality of chatbot profiles for a subsequent interaction session with the user based on the ranking of the chatbot profiles (308). In some examples, computing system 102 (e.g., conversation engine 118 of computing system 102) may use the selected chatbot profile for the subsequent interaction session with user 110 without user 110 wearing biometric collection device(s) 106.

In some examples, scoring system 116 may also receive persona preference data from user 110 and may determine the ranking of the chatbot profiles based on the scores for the chatbot profiles and the persona preference data from the user. The persona preference data may include data indicating the conscious preferences of user 110 with respect to the persona of the chatbot profile. For instance, the persona preference data may indicate how user 110 feels about the persona of the chatbot profile relative to the personas of other chatbot profiles. In some examples, the persona preference data may include self-reported emotional response values from user 110. In this example, scoring system 116 may use the self-reported emotional response values to update the score for the chatbot profile, which scoring system 116 may ultimately use to rank the chatbot profiles.

Figure 4:
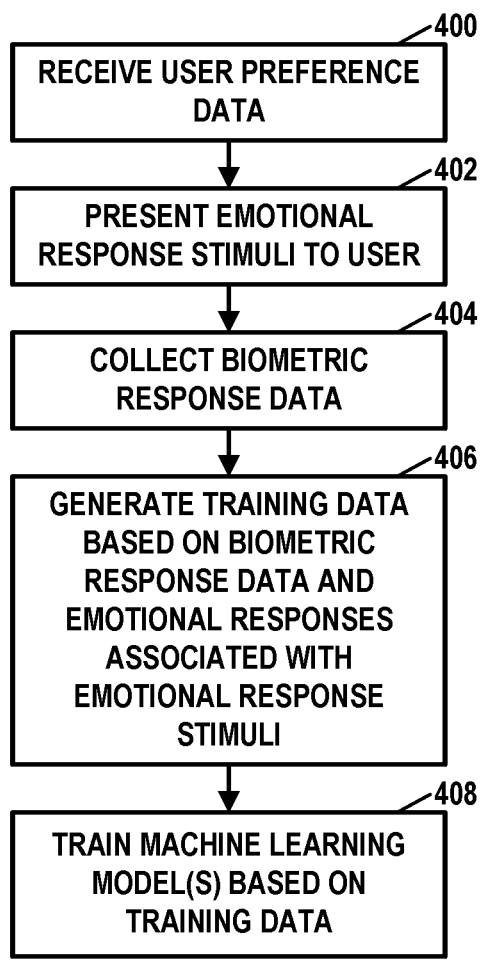
FIG. 4 is a flowchart illustrating an example operation of a computing system for training a machine learning (ML) model in accordance with one or more techniques of this disclosure.

FIG. 4 is a flowchart illustrating an example operation of computing system 102 for training ML model 122 in accordance with one or more techniques of this disclosure. As previously described, ML model 122 may need to be trained to correlate the biometric response data of individual users with emotional response values. As part of this training process, training system 112 may receive user preference data (400). The user preference data may indicate things to which user 110 has an emotional response. For example, the user preference data may indicate music, pictures, videos, text, etc. that make user 110 feel happy, sad, disturbed, distressed, and so on. In some examples, training system 112 may receive the user preference data as entries in a predetermined fillable form. These emotional responses may correspond to emotional response values.

Furthermore, in the example of FIG. 4, training system 112 may present emotional response stimuli to user 110 while user 110 is using one or more biometric collection device(s) 106 (402). Training system 112 may collect biometric response data for user 110 while training system 112 presents the emotional response stimuli to user 110 (404). The emotional response stimuli may include the music, pictures, videos, text, etc. indicated by the user preference data. Thus, in one example, when training system 112 presents a picture that is known to make user 110 feel sad, the biometric response data collected by biometric collection device(s) 106 may represent the biometric response of user 110 when user 110 feels sadness.

Training system 112 may generate training data based on the biometric response data and emotional response values associated with the emotional response stimuli (406). For example, training system 112 may generate input-target pairs, where the input of an input-target pair comprises biometric response data of user 110 when user 110 is presented an emotional response stimulus and the target of the input-target pair is an emotional response value associated with the emotional response stimulus.

Training system 112 may then train ML model 122 to generate emotional response values based on the training data (408). For instance, training system 112 may train ML model 122 based on the training data using a supervised learning process.

In some examples, training system 112 may also obtain user feedback data from user 110. The user feedback data may indicate a self-reported conscious emotional response of user 110 to an emotional response stimulus. As part of training the ML model to detect the emotional responses of user 110, training system 112 may train the ML model 122 to detect the emotional responses of user 110 the based on the biometric response calibration data of user 110 and the user feedback data for user 110. For instance, rather than using prior knowledge of the emotional responses of user 110 to the user preference data, training system 112 may obtain actual user feedback from user 110 indicating an emotional response of user 110 when user 110 is presented the emotional response stimuli while user 110 is using biometric collection device(s).

Figure 5:
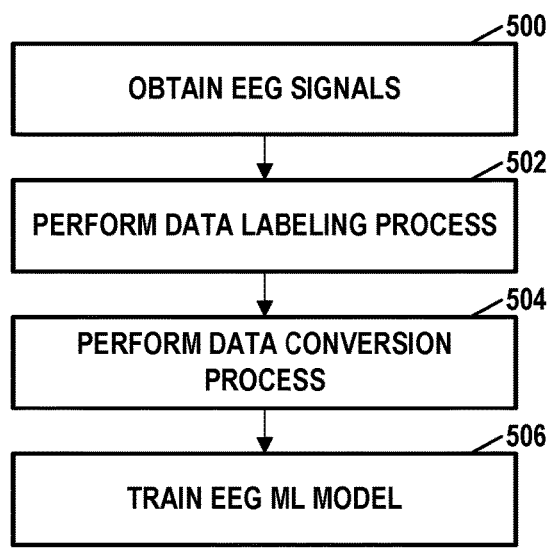
FIG. 5 is a flowchart illustrating an example operation of a computing system for training an electroencephalogram (EEG) ML model in accordance with one or more techniques of this disclosure.

FIG. 5 is a flowchart illustrating an example operation of computing system 102 for training an electroencephalogram (EEG) ML model in accordance with one or more techniques of this disclosure. In the example of FIG. 5, biometric response data (e.g., biometric response calibration data 212, biometric response data 214, etc.) may include EEG signals. The EEG signals may also be referred to as "brainwaves." Example types of brainwaves may include alpha waves, beta waves, gamma waves, and delta waves. Alpha waves are neural oscillations in the frequency range of 8-12 Hz. Beta waves are neural oscillations in the frequency range of 12.5-30 Hz. Gamma waves are neural oscillations in the frequency range of 25-140 Hz. Delta waves are neural oscillations in the frequency range of 0.5-4 Hz.

Thus, in the example of FIG. 5, training system 112 may obtain the EEG signals (500). For instance, computing system 102 may receive the EEG signals via a Bluetooth or other wireless or wire-based communication link. Furthermore, in some examples, training system 112 may convert the EEG signals into a comma-separated values (CSV) file for processing. Furthermore, in the example of FIG. 5, training system 112 may perform a data labeling process (502). During the data labeling process, segments of the EEG signals are associated with emotion-related labels. For instance, the emotion-related labels may indicate positive emotion, neutral emotion, negative emotion, etc. The emotion-related labels may correspond to different emotional response values.

Furthermore, in the example of FIG. 5, training system 112 may perform a data conversion process on the EEG signals (504). The data conversion process may convert the EEG signals into a form usable by the EEG ML model. In some examples, the data conversion process may include application of a Fast Fourier Transform (FFT) to the EEG signals to convert the EEG signals into sets of transform coefficients in a frequency domain. Furthermore, the data conversion process may include frequency binning. Frequency binning is a form of quantizing the transform coefficients. For example, as part of frequency binning, training system 112 may group EFT amplitudes into a theta group (4-8 Hz), an alpha group (8-12 Hz), and a beta group (12-40 Hz), thus giving 3 scalar values for each probe per frame. After performing frequency binning on the transform coefficients, the data conversion process may then perform a 2D azimuthal projection on the scalar values. Performing the 2D azimuthal projection may result in a 2-dimensional grid of scalar values.

Training system 112 may then train the EEG ML model (e.g., ML model 122) based on the converted EEG signals and the emotion-related labels (506). For instance, training system 112 may perform a supervised learning process to train the EEG ML model based on the 2-dimensional grid of scalar values as training inputs and the emotional response values as target values.

In some examples, the EEG ML model may include a series of two 2D convolutional layers, followed by a 2D max pooling layer, and two dense layers. For instance, the EEG ML model may include one 2-dimensional convolution layer with 'same' padding which may be followed by ReLU activation and a second 2-dimensional convolution layer with 'same' padding and ReLU activation function. The second 2-dimensional convolution layer may be followed by a max-pooling layer where the pool-size is [2,2] and followed by a dropout, flatten, dense, ReLU activation, dense, softmax Activation function, and RMS optimizer layers. The EEG ML model may be compiled with a categorical_crossentropy loss.

Figure 6:
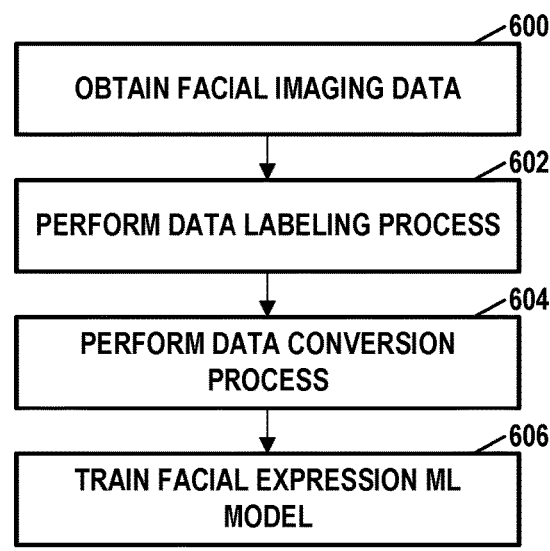
FIG. 6 is a flowchart illustrating an example operation of a computing system for training a facial expression ML model in accordance with one or more techniques of this disclosure.

FIG. 6 is a flowchart illustrating an example operation of a computing system for training a facial expression ML model in accordance with one or more techniques of this disclosure. In the example of FIG. 6, biometric response data (e.g., biometric response calibration data 212, biometric response data 214, etc.) may include facial imaging data. Thus, in the example of FIG. 6, training system 112 may obtain facial imaging data (600). Additionally, training system 112 may perform a data labeling process (602). During the data labeling process, training system 112 may receive indications (e.g., indications of user input) of emotion-related labels for segments of the facial imaging data. For instance, the emotion-related labels may indicate positive emotion, neutral emotion, negative emotion, etc. In another example, the emotion-related labels may indicate more specific emotions, such as happy, neutral, sad, surprised, fear, etc. The emotion-related labels may correspond to different emotional response values.

Additionally, in the example of FIG. 6, training system 112 may perform a data conversion process on the facial imaging data (604). The data conversion process may convert the facial imaging data into a form usable by the facial expression ML model. For example, as part of performing the data conversion process, training system 112 may reduce a frame rate of the facial imaging data and/or equalize the frame sizes of fames of the facial imaging data. Furthermore, as part of performing the data conversion process, training system 112 may convert the frames of the facial imaging data to grayscale. In some examples, training system 112 may apply interference and noise reduction processes to the frames of the facial imaging data. Training system 112 may use the converted facial imaging data and the labels to train the facial expression ML model (606). For instance, training system 112 may perform a supervised learning process to train the facial expression ML model with the facial imaging data as input values and the labels (e.g., emotional response values) as target values. In some examples, the structure of the facial expression ML model may be implemented as one 2-dimensional convolution layer with 'same' padding which will be followed by a batch normalized layer. The same configuration may be repeated. The identical two layers may be followed by a ReLU activation function and an average pooling layer and a dropout layer. This seven-layer section may then be repeated four times, followed by a 2-dimensional convolution layer (same padding), Batch Normalization Layer, again a 2-dimensional convolution layer (same padding), a GlobalAveragePooling2D layer, and a softmax activation layer.

In some examples, ML models, such as the EEG ML model and facial ML, are not specific to an individual user, such as user 110. Rather, training system 112 may train one or more of the ML models based on data from multiple users. In some examples, there may be different ML models trained for different types of users. For example, there may be different ML models trained for users for different ages, ethnicities, genders, or other categories of users.

FIG. 7 is a flowchart illustrating an example operation of computing system 102 for determining a score for a chatbot profile in accordance with one or more techniques of this disclosure. In the example of FIG. 7, scoring system 116 of computing system 102 may collect biometric response data (e.g., biometric response data 214) for user 110 while user 110 has an interaction session with a chatbot profile (e.g., one of chatbot profiles 124) (700). The biometric response data may include one or more types of data. For example, the biometric response data may include one or more of EEG data, facial imaging data, and so on. Furthermore, in some examples, the biometric response data may include blood oxygen saturation data.

Furthermore, in the example of FIG. 7, scoring system 116 may determine one or more emotional response values for the interaction session based on the biometric response data (702). Scoring system 116 may apply one or more ML models (e.g., ML model 122) to determine emotional response value(s) for the interaction session with the chatbot profile based on the biometric response data collected from user 110 while user 110 has the interaction session with the chatbot profile. The emotional response value for the interaction session with the chatbot profile is associated with an emotional response of user 110 to the chatbot profile represented by the biometric response data collected from user 110 while user 110 has the interaction session with the chatbot profile. For example, scoring system 116 may apply an EEG ML model (e.g., a first ML model) to determine an EEG emotional response value (e.g., a first emotional response value) for the interaction session based on EEG data of the biometric response data. In some examples, scoring system 116 may apply a facial expression ML model (e.g., a second ML model) to determine a facial expression emotional response value (e.g., a second emotional response value) for the interaction session based on facial imaging data of the biometric response data.

In some examples, scoring system 116 determine an anxiety emotional response value corresponding to an anxiety level of user 110 based on the blood oxygen saturation data of the biometric response data. For example, scoring system 116 may use the Corah's Scale to determine the anxiety emotional response value based on the blood oxygen saturation data. For instance, scoring system 116 may assign a first anxiety emotional response value based on the blood oxygen saturation being less than 9, a second anxiety emotional response value based on the blood oxygen saturation being in a range from 9 to 12 on the Corah's Scale, a third anxiety emotional response value based on the blood oxygen saturation being in a range from 13-14 on the Corah's Scale, and a fourth anxiety emotional response value based on the blood oxygen saturation being in a range of 15-20 on the Corah's Scale.

Scoring system 116 may then determine a session score for the interaction session based on the emotional response value(s) (704). In some examples, scoring system 116 may determine the session score for the interaction session as a weighted average of the emotional response values. For instance, in one example, an EEG emotional response value (denoted eeg ERV) equal to 1 may indicate a positive emotion, an EEG emotional response value equal to 2 may indicate a neutral emotion, and an EEG emotional response value equal to 3 may indicate a negative emotion. In this example, a facial expression emotional response value (denoted facial ERV) equal to 1 may indicate happiness, 2 may equal surprise, 3 may indicate neutral, 4 may indicate fear, and 5 may indicate sadness. Furthermore, in this example, an anxiety emotional response value (denoted anxiety ERV) equal to 1 may indicate low anxiety (e.g., a blood oxygen saturation less than 9 on the Corah's Scale, 2 may indicate moderate anxiety (e.g., a blood oxygen saturation in a range of 9-12 on the Corah's Scale), 3 may indicate high anxiety (e.g., a blood oxygen saturation in a range of 13-14 on the Corah's Scale), and 4 may indicate severe anxiety (e.g., a blood oxygen saturation in a range of 15-20 on the Corah's Scale). In this example, scoring system 116 may determine the session score for the interaction session as (eeg_ERV*20+facial_ERV*12+anxiety_ERV*15)/3.

In some examples, scoring system 116 may determine emotional response values at multiple times during the interaction session. For instance, in one example, scoring system 116 may determine first emotional response values based on biometric response data collected at or close to the beginning of the interaction session. In this example, scoring system 116 may determine second emotional response values based on biometric response data collected at a later point in the interaction session (e.g., at or close to an end of the interaction session). Furthermore, in this example, scoring system 116 may calculate differences between pairs of emotional response values. For instance, scoring system 116 may calculate a difference between an emotional response value generated by the EEG ML model at the beginning of the interaction session and an emotional response value generated by the EEG ML model at the end of the interaction session; calculate a difference between an emotional response value generated by the facial expression ML model at the beginning of the interaction session and an emotional response value generated by the facial expression ML model at the end of the interaction session, and so on. Scoring system 116 may determine the session score based on these differences. For instance, scoring system 116 may determine the session score for the interaction session as (delta<eeg_ERV>*20+delta<facial_ERV>*12+ delta<anxiety_ERV>*15)/3, where delta<eeg_ERV> indicates the difference in emotional response values generated by the EEG ML model, delta<facial_ERV> indicates the difference in emotional response values generated by the facial recognition ML model, and delta<anxiety_ERV> indicates the difference in anxiety emotional response values.

Furthermore, in the example of FIG. 7, scoring system 116 may update the score for the chatbot based on the session score (706). For example, scoring system 116 may update the score for the chatbot such that the score for the chatbot is an average of the session score and previously determined session scores for the chatbot. In other examples, scoring system 116 may update the score for the chatbot such that the score for the chatbot is a mean or weighted average of the session score and previously determined session scores for the chatbot.

Thus, in some examples, in some examples, for each chatbot profile of the plurality of chatbot profiles, scoring system 116 may collect blood oxygen saturation data for the user while user 110 has the interaction session with the chatbot profile, determine an anxiety emotional response value of user 110 based on the blood oxygen saturation data, and update the score for the chatbot profile based on a first emotional response value (e.g., an emotional response value generated based on output of an EEG ML model), a second emotional response value (e.g., an emotional response value generated based on output of a facial recognition ML model), and the anxiety emotional response value.

In this disclosure, ordinal terms such as "first," "second," "third," and so on, are not necessarily indicators of positions within an order, but rather may be used to distinguish different instances of the same thing. Examples provided in this disclosure may be used together, separately, or in various combinations. Furthermore, with respect to examples that involve personal data regarding a user, it may be required that such personal data only be used with the permission of the user.

The following paragraphs provide a non-limiting list of examples in accordance with techniques of this disclosure.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processing circuits to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, cache memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Functionality described in this disclosure may be performed by fixed function and/or programmable processing circuitry. For instance, instructions may be executed by fixed function and/or programmable processing circuitry. Such processing circuitry may include one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements. Processing circuits may be coupled to other components in various ways. For example, a processing circuit may be coupled to other components via an internal device interconnect, a wired or wireless network connection, or another communication medium.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

What is claimed is:

1. A computer-implemented method comprising:
    storing, by one or more processors, a score for each chatbot profile of a plurality of chatbot profiles, wherein each of the plurality of chatbot profiles corresponds to a respective persona;
    for each chatbot profile of the plurality of chatbot profiles:
        collecting, by the one or more processors, biometric response data for a user while the user has an interaction session with the chatbot profile, the biometric response data comprising blood oxygen saturation data;
        determining, by the one or more processors, an emotional response value of the user based on the blood oxygen saturation data; and
        updating, by the one or more processors, the score for the chatbot profile based on the emotional response value;
    determining, by the one or more processors, a ranking of the plurality of chatbot profiles based on the scores for the plurality of chatbot profiles; and
    selecting, by the one or more processors, a chatbot profile from the plurality of chatbot profiles for a subsequent interaction session with the user based on the ranking of the plurality of chatbot profiles.

2. The computer-implemented method of claim 1, wherein the biometric response data includes electroencephalogram (EEG) data.

3. The computer-implemented method of claim 1, wherein the biometric response data includes facial imaging data.

4. The computer-implemented method of claim 1, wherein updating the score for the chatbot profile comprises:
    applying, by the one or more processors, a machine-learning (ML) model to determine the emotional response value for the interaction session with the chatbot profile based on the blood oxygen saturation data collected from the user while the user has the interaction session with the chatbot profile, wherein the emotional response value for the interaction session with the chatbot profile is associated with an emotional response of the user to the chatbot profile represented by the blood oxygen saturation data collected from the user while the user has the interaction session with the chatbot profile; and
    updating, by the one or more processors, the score for the chatbot profile based on the emotional response value for the interaction session for the chatbot profile.

5. The computer-implemented method of claim 4, further comprising:
    collecting, by the one or more processors, biometric response calibration data for the user; and
    training, by the one or more processors, the ML model to determine emotional response values based on the biometric response calibration data of the user.

6. The computer-implemented method of claim 5, further comprising:
    obtaining, by the one or more processors, user feedback data from the user,
    wherein training the ML model to determine the emotional response values comprises training, by the one or more processors, the ML model to detect emotional responses of the user based on the biometric response calibration data of the user and the user feedback data from the user.

7. The computer-implemented method of claim 4, wherein:
    the ML model is a first ML model,
    the biometric response data for the user is first biometric response data, and the emotional response value for the interaction session is a first emotional response value for the interaction session, the method further comprising, for each chatbot profile of the plurality of chatbot profiles:
collecting, by the one or more processors, second biometric response data for the user while the user has the interaction session with the chatbot profile; and
applying, by the one or more processors, a second ML model to determine a second emotional response value for the interaction session with the chatbot profile based on the second biometric response data, wherein the second emotional response value for the interaction session with the chatbot profile is associated with an emotional response of the user to the chatbot profile represented by the second biometric response data; and
updating the score for the chatbot profile comprises updating the score for the chatbot profile based on the first and second emotional response values for the interaction session with the chatbot profile.

8. The computer-implemented method of claim 7, wherein the second biometric response data comprises one of: EEG data and facial imaging data.

9. The computer-implemented method of claim 7, further comprising:
for each chatbot profile of the plurality of chatbot profiles:
collecting, by the one or more processors, the blood oxygen saturation data for the user while the user has the interaction session with the chatbot profile; and
determining, by the one or more processors, the anxiety emotional response value of the user based on the blood oxygen saturation data,
wherein updating the score for the chatbot profile comprises updating, by the one or more processors, the score for the chatbot profile based on the first emotional response value, the second emotional response value, and the anxiety emotional response value.

10. The computer-implemented method of claim 1, further comprising, for at least one chatbot profile of the plurality of chatbot profiles:
obtaining, by the one or more processors, transcribed speech of a person having the persona corresponding to the chatbot profile;
training, by the one or more processors, a conversation model to generate responses based on the transcribed speech; and
applying, by the one or more processors, the conversation model to generate the responses during the interaction session with the user.

11. The computer-implemented method of claim 1, wherein:
collecting the biometric response data for the user comprises collecting, by the one or more processors, the biometric response data from a biometric collection device worn by the user, and
using, by the one or more processors, the selected chatbot profile for the subsequent interaction session with the user without the user wearing the biometric collection device.

12. A computing system comprising:
a storage system configured to store a score for each chatbot profile of a plurality of chatbot profiles, wherein each of the plurality of chatbot profiles corresponds to a respective persona; and
one or more processors communicatively coupled to the storage system, the one or more processors configured to:
for each chatbot profile of the plurality of chatbot profiles:
collect biometric response data for a user while the user has an interaction session with the chatbot profile, the biometric response data comprising blood oxygen saturation date;
determine an emotional response value of the user based on the blood oxygen saturation data; and
update the score for the chatbot profile based on the emotional response value;
determine a ranking of the plurality of chatbot profiles based on the scores for the plurality of chatbot profiles; and
select a chatbot profile from the plurality of chatbot profiles for a subsequent interaction session with the user based on the ranking of the plurality of chatbot profiles.

13. The computing system of claim 12, wherein the biometric response data includes electroencephalogram (EEG) data.

14. The computing system of claim 12, wherein the biometric response data includes facial imaging data.

15. The computing system of claim 12, wherein the one or more processors are configured to, as part of updating the score for the chatbot profile:
apply a machine-learning (ML) model to determine the emotional response value for the interaction session with the chatbot profile based on the blood oxygen saturation data collected from the user while the user has the interaction session with the chatbot profile, wherein the emotional response value for the interaction session with the chatbot profile is associated with an emotional response of the user to the chatbot profile represented by the blood oxygen saturation data collected from the user while the user has the interaction session with the chatbot profile; and
update the score for the chatbot profile based on the emotional response value for the interaction session for the chatbot profile.

16. The computing system of claim 15, wherein the one or more processors are further configured to:
collect biometric response calibration data for the user; and
train the ML model to determine emotional response values of the user based on biometric response calibration data of the user.

17. The computing system of claim 15, wherein:
the ML model is a first ML model,
the biometric response data for the user is first biometric response data,
the emotional response value for the interaction session is a first emotional response value for the interaction session, and
for each chatbot profile of the plurality of chatbot profiles:
the one or more processors are further configured to:
collect second biometric response data for the user while the user has the interaction session with the chatbot profile; and
apply a second ML model to determine a second emotional response value for the interaction session with the chatbot profile based on the second biometric response data, wherein the second emotional response value for the interaction session with the chatbot profile is associated with an emotional response of the user to the chatbot profile represented by the second biometric response data; and the one or more processors are configured to, as part of updating the score for the chatbot profile, update the score for the chatbot profile based on the first and second emotional response values for the interaction session with the chatbot profile.

18. The computing system of claim 12, wherein:

the one or more processors are configured to, as part of collecting the biometric response data for the user, collect the biometric response data from a biometric collection device worn by the user, and the one or more processors are configured to use the selected chatbot profile for the subsequent interaction session with the user without the user wearing the biometric collection device.

19. One or more non-transitory computer-readable storage media comprising instructions stored thereon that, when executed by one or more processors, cause the one or more processors to:

initialize a score for each chatbot profile of a plurality of chatbot profiles, wherein each of the plurality of chatbot profiles corresponds to a respective persona;

for each chatbot profile of the plurality of chatbot profiles:
collect biometric response data for a user while the user has an interaction session with the chatbot profile, the biometric response data comprising blood oxygen saturation data;

determine an emotional response value of the user based on the blood oxygen saturation data; and update the score for the chatbot profile based on the emotional response value;

determine a ranking of the plurality of chatbot profiles based on the scores for the plurality of chatbot profiles; and select a chatbot profile from the plurality of chatbot profiles for a subsequent interaction session with the user based on the ranking of the plurality of chatbot profiles.

20. The one or more non-transitory computer-readable storage media of claim 19, further comprising instructions stored thereon that, when executed by the one or more processors, cause the one or more processors to:

apply a machine-learning (ML) model to determine the emotional response value for the interaction session with the chatbot profile based on the blood oxygen saturation data collected from the user while the user has the interaction session with the chatbot profile, wherein the emotional response value for the interaction session with the chatbot profile is associated with an emotional response of the user to the chatbot profile represented by the blood oxygen saturation data collected from the user while the user has the interaction session with the chatbot profile; and update the score for the chatbot profile based on the emotional response value for the interaction session for the chatbot profile.

* * * * *